Dec. 11, 1928.
P. H. HAMILTON
VALVE
Filed April 7, 1926
1,694,777
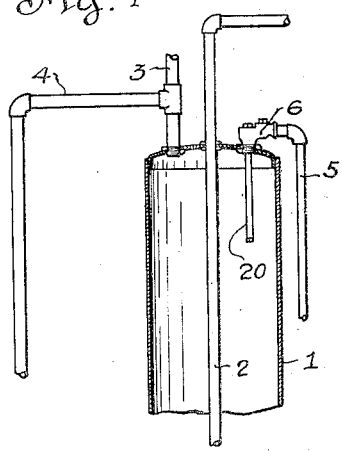
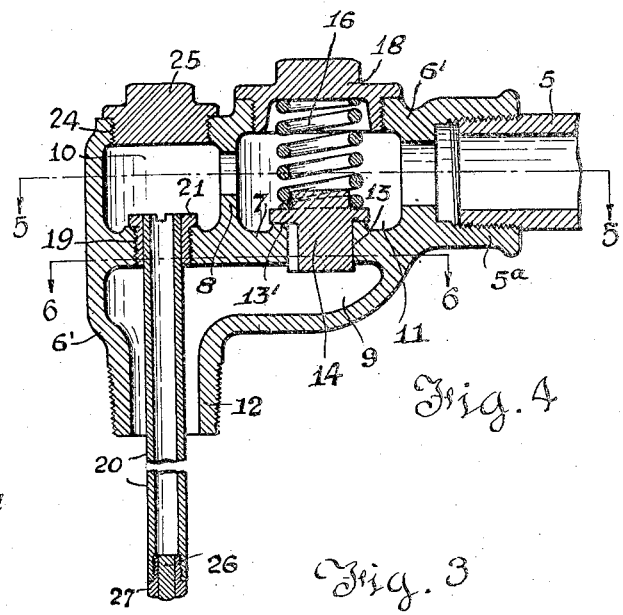
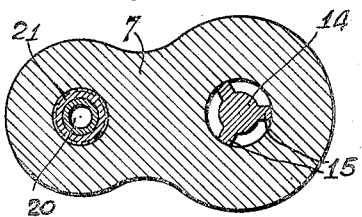
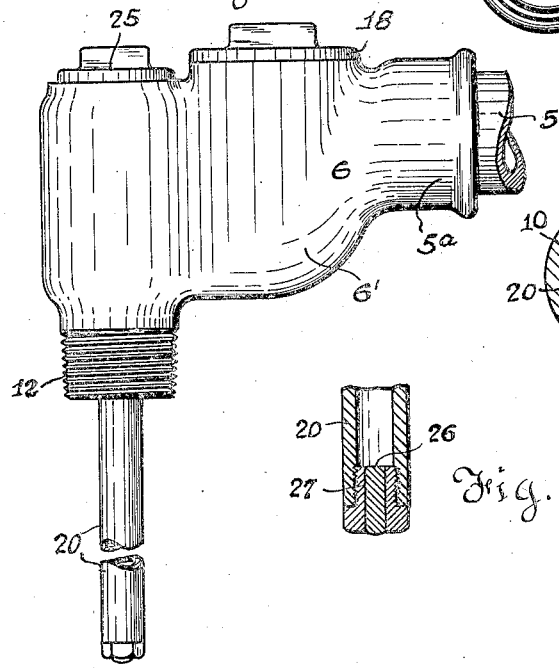
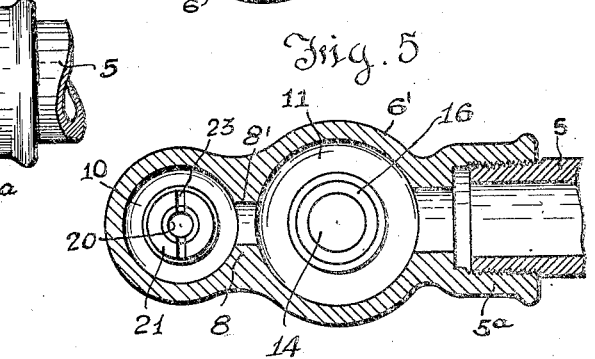
INVENTOR.
Paul H. Hamilton
BY
Geo. H. Pitts
ATTORNEY.

Patented Dec. 11, 1928.

1,694,777

UNITED STATES PATENT OFFICE.

PAUL H. HAMILTON, OF CLEVELAND, OHIO, ASSIGNOR TO THE SANDS MANUFACTURING COMPANY, OF CLEVELAND, OHIO, A CORPORATION OF OHIO.

VALVE.

Application filed April 7, 1926. Serial No. 100,309.

The present invention relates to valves, and more particularly to a combined safety and pressure relief valve for use with storage tanks, conduits, manifolds and the like containing heated fluid, such as water.

An object of the invention is to provide a valve of this type which may be set or adjusted at the factory where manufactured to relieve pressure at a given point, either due to generation of vapor or pressure of the fluid and remain adjusted for all time for such pressure.

Another object is to provide a valve having this characteristic of predetermined set pressure, and at the same time which has a safety release means of the thermal type, which is mounted and operates independently of the pressure relief valve, so that the structures are independent one of the other and yet so mounted in a single housing and interconnected by passages as to cooperate to secure the desired result of relieving the pressure in the boiler or other device containing fluid when beyond a predetermined safety limit or upon the sticking or failure to operate of the pressure relief valve.

Another object of the invention is to provide a safety relief pipe which carries a fusible plug, the pipe being so mounted in the valve casing that it may be removed for replenishing the fusible plug without disturbing the adjustment of the pressure relief valve.

With the foregoing and other objects in view, the invention will be more fully described hereinafter, and will be more particularly pointed out in the claims appended hereto.

In the drawings, Figure 1 is a fragmentary sectional view taken through the upper end of a storage or stand boiler showing the usual pipe connections thereto and showing a combined pressure relief and safety valve connected to the tank and constructed according to the present invention.

Figure 2 is a side elevation, enlarged, of a pressure relief and safety valve constructed according to the present invention.

Figure 3 is a top plan view of the same.

Figure 4 is a vertical or longitudinal section taken through the valve.

Figure 5 is a horizontal section taken on the line 5—5 of Figure 4.

Figure 6 is a horizontal section taken through Figure 4 on the line 6—6, and

Figure 7 is a fragmentary enlarged sectional view of the safety tube with fusible plug therein.

In Fig. 1, 1 indicates a container, such as an ordinary stand or storage boiler, provided with the usual inlet pipe 2 for cold water, which preferably extends down through the boiler 1 a suitable distance for delivering the cold water into the lower portion thereof.

A hot water take-off pipe 3 is connected to the upper head of the boiler 1 at one side thereof and leads to the service pipes in the dwelling or other place where hot water is to be used. A branch pipe 4 leads from the service pipe 3 in the usual manner and is adapted to extend to a heater such as a burner, a furnace or the like (not shown) and forms the upper leg of the usual heating circuit for the water in the boiler 1.

A safety outlet or discharge pipe 5 is provided at the upper end of the boiler 1, being connected to the upper end thereof by means of my improved pressure relief and safety valve indicated as an entirety at 6, as shown in Figure 1. This improved valve 6 comprises a casing 6' which is preferably elongated and shaped at one side to form an outlet nipple 5ª, threaded, or otherwise suitably secured to the discharge pipe 5.

7 indicates a horizontal wall and 8 indicates a transverse vertical wall extending between the side walls of the casing 6' and forming a main chamber 9 and outlet chambers 10, 11, the wall 8 being formed with an opening or port 8' (preferably in alignment with the nipple 5ª), whereby they are connected, so that escaping fluid or vapor may pass from one to the other, for example, in the illustrated arrangement, from the chamber 10 to the chamber 11 for discharge through the pipe 5.

The side walls of the casing below the horizontal wall 7 are shaped to form an inlet nipple or pipe 12 which is preferably threaded so that it may fit into a suitably threaded opening in the container for connection therewith. The nipple 12 is disposed near one end of the casing 6' so that it will be below the chamber 10 for reasons which will later appear.

13 indicates an opening formed in the wall 7 and leading from the main chamber 9 into the outlet chamber 11, the upper end of the opening having a rim 13' which forms a seat for a valve element 14. The valve seat 13' and the valve element 14 may be of any desired construction, the latter being preferably provided with depending wings 15 which guide the valve vertically in a well known manner. 16 indicates a coiled spring interposed between the valve element 14 (its lower end surrounding a boss on the valve element) and the top wall of the casing 6' and normally tending to seat the valve element. For well known reasons, the top wall of the casing 6' above the valve 14 is formed with an opening 17 to receive a plug 18, the latter having a screw threaded connection with the walls of the opening, whereby it may be rotated. As shown, the cap forms an abutment and a seat for the upper end of the spring 16, so that by rotating the cap the tension of the spring is adjusted to permit unseating of the valve element 14 only when a predetermined pressure is set up in the boiler or container 1. The cap 18 being removable, it permits ready assembly and removal of the valve element and its operating spring. The cap or plug 18 may be provided with an angularly faced projection or nut portion on its top by means of which it may be readily removed or adjusted as desired.

Preferably this cap 18 is recessed on its inner faces so as to receive and accommodate the outer end of the spring 16.

Since the spring 16 is adjusted at the plant in the assembly of the parts, it may be made of a size and length to engage the valve element with the desired tension when the cap is screwed down with its flange engaging the casing walls, as shown in Fig. 4.

19 indicates an opening formed in the wall 7 substantially concentric to the inlet nipple 12 and removably supporting the upper end of a relief pipe 20 which depends downwardly therefrom through the nipple 12 with its lower free end immersed in the fluid in the container 1. The upper end of the pipe 20 is provided with a bushing or sleeve 21, preferably threaded externally for engagement with threads on the walls of the opening 19 formed in the wall 7 concentric to the nipple 12. The bushing or sleeve 21 may be sweated on or otherwise suitably secured to the pipe 20 and the upper edges of the pipe and bushing may be formed with slots 23 for engagement with a tool, whereby the pipe may be unscrewed and removed. For this latter purpose, the upper wall of the casing is formed with a threaded opening 24 in which is removably mounted a threaded plug or cap 25.

26 indicates a fusible material fitted in and closing the lower end of the relief or escape pipe 20. By preference, the fusible material 26 is positioned in and closes the opening through a hollow plug 27, which is screw threaded into the lower end of the pipe 20 and thus permits the fusible material to be readily replaced and securely mounted in the pipe 20. The plugs 27 are preferably provided with a knurled head, which serves as a flange to engage the lower end of the pipe and thus insure a liquid tight joint therewith. The fusible material 26 may be alloyed to melt at any desired temperature. Under ordinary conditions it may be made to melt at 200 degrees F. As shown in Fig. 4, the pipe 20 is relatively small and thus provides ample space around it for the passage of vapor or liquid from the inlet nipple 12, into the main chamber 9 where it may act on the valve element and escape to relieve pressure greater than that at which the latter is set.

In the arrangement herein disclosed but one inlet nipple or inlet connection with the container is required to permit of the escape of the elements to and through the relief valve, and for the support of the discharge pipe and its extension into the container with its fusible closing plug immersed in the fluid.

In use and operation, the improved valve is assembled at the factory or the like with the relief or check valve 14 in its chamber 11 and with the spring 16 mounted substantially permanently in place, so that the device may be accurately adjusted for relief of the desired pressure. The safety relief tube 20 is inserted down through the chamber 10 and held in place by the bushing 21. The valve when applied to a boiler 1 or other container of any suitable type, is merely screwed into the upper portion thereof as shown in Figure 1, by means of the nipple 12 and the relief pipe 5 then screwed into the outlet nipple 5ᵃ of the device.

When abnormal pressure is reached in the boiler 1, the check valve 14 is adapted to raise and relieve this pressure through the inlet or main chamber 9 of the casing and through the chamber 11 to the relief pipe 5. Should for any reason the check valve 14 fail to unseat and the fluid or resulting steam in the upper end of the boiler 1 rise to a temperature sufficient to fuse the material 26, then the latter would melt and thus open the outlet through the plug 27. As soon as the fusible plug 26 melts the escape of the fluid or vapor or both takes place through the pipe 20 into the chamber 10, through the port 8' and chamber 11, and through the outlet nipple 5ᵃ into the relief pipe 5. In order to renew the plug 26 it would then only be necessary to remove the plug 25 and unscrew the bushing 21 and pipe 20 and remove them from the chamber. As will be understood, this operation may be effected without disturbing the adjustment of the valve 14. Of course if it is found necessary to gain access to the valve 14 for renewal or repair, it is only necessary to remove the cap 18 when the valve and its spring may be taken separately out through the top of the chamber 11 and without disturbing the adjustment or positioning of the safety pipe 20.

In the use of the word "container" throughout the specification and the appended claims applicant does not wish to be limited thereby, since the container to which the valve is connected may be a manifold, pipe or conduit as well as a tank, or a connecting fitting therefor. It is obvious that various changes and modifications may be made in the details of construction and design of the above specifically described embodiment of this invention without departing from the spirit thereof, such changes and modifications being restricted only by the scope of the following claims:—

What I claim is:

1. In a relief valve, a casing having an inlet nipple connected to a container for heated fluid and walls forming two connected chambers and a main chamber into which said inlet leads, a port between said main chamber and one of said connected chambers, a spring pressed valve for normally closing said port, a pipe supported in one of said walls and leading from the other one of said connected chambers downwardly through said nipple for immersion in the fluid in said container and closed at its lower end with a fusible material, and an outlet leading from one of said connected chambers.

2. A valve as claimed in claim 1 in which means are provided for adjusting the tension of the spring for said valve.

3. A valve as claimed in claim 1 in which the pipe is removable.

4. A valve as claimed in claim 1 in which the pipe is removable and the fusible material is carried by a fitting removably connected to the pipe.

5. In a combined pressure relief and safety blow off valve, a casing provided with an outlet portion and having a pair of chambers communicating with each other and with said outlet portion, said casing also having an inlet portion opening at one end into one of said chambers and at its other end terminating in a nipple coaxial with the other chamber, a check valve biased to closed position in the first chamber for normally closing communication between the inlet portion of the casing and the first chamber, a straight safety tube carried in one wall of said other chamber and extending downwardly therefrom through said inlet portion of the casing and through said nipple, and a removable fusible plug mounted in the lower end of said safety tube.

6. In a relief valve, a casing comprising a main chamber having an inlet for connection with a container and connected chambers one of which is disposed above said inlet, a port from said main chamber into the other of said connected chambers, a check valve normally closing said port, an outlet from one of said connected chambers, a pipe removably mounted in the bottom wall of the chamber above said inlet and extending downwardly through the latter for immersion in the fluid in the container, and a fusible material closing said pipe and adapted to be positioned therein below the fluid level.

7. A valve as claimed in claim 6 in which the upper walls of said connected chambers are provided with removable caps.

8. In a combined pressure relief and safety blow off device, a casing provided with inlet and outlet portions and walls formed with openings to provide separate chambers inter-communicating with each other and with said portions, a check valve arranged in the opening between said inlet portion and one chamber for normally closing communication into said chamber, and a pipe mounted in the opening between a second chamber and said inlet portion and carrying a fusible plug for closing the passage through said pipe.

9. In a device of the class described, a casing having therein communicating chambers and a separate chamber below said communicating chambers, the wall between said communicating chambers and said separate chamber being formed with openings, said casing having an outlet portion leading from said communicating chambers and an inlet portion extending axially of one of said openings leading into said separate chamber, a check valve normally closing the other opening, and a safety tube mounted in the first mentioned opening and extending downwardly through said inlet portion and having a fusible plug therein for venting the tube at a predetermined temperature through the adjacent communicating chamber.

10. In a combined pressure relief and safety blow off device, a casing having inter-communicating adjacent and independent chambers and an inlet portion, a separate removable plug closing the upper end of each said chamber, a check valve device removable through the upper end of one of said chambers and arranged to control communication from the inlet portion into the chamber, and a safety tube device removable through the upper end of the other chamber and provided with a fusible plug for the closing of the passage therethrough, said casing having an outlet portion communicating with one of said chambers.

In testimony whereof, I have hereunto subscribed my name.

PAUL H. HAMILTON.